United States Patent [19]

Gray

[11] Patent Number: 4,599,902
[45] Date of Patent: Jul. 15, 1986

[54] CONDITION RESPONSIVE APPARATUS

[75] Inventor: Tommy L. Gray, Dallas, Tex.

[73] Assignee: Span Instruments, Inc., Plano, Tex.

[21] Appl. No.: 656,490

[22] Filed: Oct. 1, 1984

[51] Int. Cl.$^4$ .............................................. G01L 7/04
[52] U.S. Cl. ...................... 73/705; 73/733; 250/231 P
[58] Field of Search ............ 73/705, 293, 733; 250/231 P, 231 SE; 377/53; 307/117; 33/DIG. 3

[56] References Cited

U.S. PATENT DOCUMENTS

| | | | |
|---|---|---|---|
| 3,196,687 | 7/1965 | Schalkowsky | 73/705 |
| 3,691,843 | 9/1972 | Gorgens et al. | 73/705 |
| 3,790,761 | 2/1974 | Crabtree | 377/53 |
| 3,820,391 | 6/1974 | Baker, Jr. et al. | 73/170 A |
| 3,863,067 | 1/1975 | Gooley | 250/231 R |
| 4,003,370 | 1/1977 | Emil et al. | 73/726 |
| 4,184,377 | 1/1980 | Hubbard | 73/733 |
| 4,275,393 | 6/1981 | Johnston | 73/705 |
| 4,342,230 | 8/1982 | Okamura et al. | 73/702 |
| 4,418,288 | 11/1983 | Imai et al. | 307/117 |

Primary Examiner—Donald O. Woodiel
Attorney, Agent, or Firm—Harold E. Meier

[57] ABSTRACT

A condition responsive apparatus is provided including a pressure gauge having a Bourdon tube expandable in response to an external pressure. In the preferred embodiment, an optical coupler, including a solid state light source and a detector, is mounted in proximity to a vane attached to the Bourdon tube. As the Bourdon tube flexes with increased pressure, the vane passes between the light source and the detector, thus blocking the radiation from the light source. The detector includes a Darlington amplifier which forms part of a voltage divider network for connecting an output signal from the Darlington amplifier to a pulse generating circuit. In operation, when the vane connected to the Bourdon tube passes between the light source and the detector, the pulse generating circuit responds to an increased voltage across the output of the voltage divider and is thus triggered to turn on a control transistor. The control transistor serves to turn on a power transistor for controlling an alarm or other control element.

16 Claims, 2 Drawing Figures

CONDITION RESPONSIVE APPARATUS

TECHNICAL FIELD

The present invention relates generally to condition responsive apparatus and more particularly to a detector circuit for use with a pressure gauge having a pressure sensitive element such as a Bourdon tube.

BACKGROUND OF THE INVENTION

Condition responsive apparatus which provide an indication or control an operation in response thereto, are well-known in the prior art. Such devices have been used in many diverse types of environments. For example, it is often desirable to determine the pressure of a fluid in a system or vessel, and condition responsive apparatus have been provided for this purpose. Such an apparatus typically includes a pressure sensitive element such as a Bourdon tube which, when connected to a source of external pressure, deflects by an amount proportional to this pressure. This deflection can then be transduced into a mechancial or electrical output to provide an indication of the fluid pressure in the tube or, alternatively, to control some other operation. An apparatus of this type is shown in U.S. Pat. No. 4,184,377 to Hubbard which discloses a hydraulic pressure transducer for use in conjunction with a vehicle braking system.

Although such condition responsive apparatus have proved generally effective for indicating a condition or controlling an operation in response to a change in the condition, these devices often utilize complex electronic control systems to provide the required output. Such control systems increase the cost of the apparatus and reduce its reliability. There is therefore a need for an improved condition responsive apparatus which is cost effective to manufacture, but which provides superior performance and reliability.

SUMMARY OF THE INVENTION

The present invention relates generally to an apparatus which includes a control member movable in response to a predetermined physical condition. In the preferred embodiment, the control member is a pressure sensitive element, such as a Bourdon tube, which is expandable in response to an externally-applied pressure. The apparatus also includes a detector circuit having an optical coupler. The optical coupler, which includes a solid state light source and a detector, is mounted in proximity to a vane attached to the Bourdon tube to allow the vane to pass between the light source and the detector. The detector includes a Darlington amplifier which forms part of a voltage divider network for connecting an output signal from the Darlington amplifier to a pulse generating circuit. In operation, when the vane moves between the light source and the detector, the pulse generating circuit responds to an increased voltage at the output of the voltage divider and is thus triggered to turn on a control transistor. An output signal from the control transistor is then used to drive a power transistor connected to a load.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
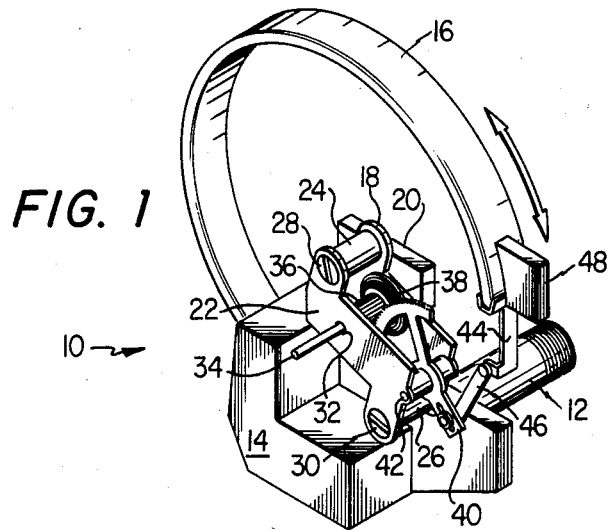
FIG. 1 is a perspective view of a Bourdon tube pressure gauge having a vane attached thereto for controlling an optical coupler.

Referring now to the drawings wherein like reference characters designate like or similar parts throughout the several views, FIG. 1 is a perspective view of a pressure gauge 10 which forms part of the condition responsive apparatus of the present invention. Specifically, the pressure gauge 10 includes a conduit 12, as partially shown on the rear thereof, attached to a mounting plate 14. The conduit 12 communicates with a well-known Bourdon or pressure tube 16. Specifically, internal passages (not shown) within the mounting block 14 connect the conduit 12 to the Bourdon tube 16.

A holding bracket 18 is attached to an extension support 20 of the mounting block 14. A holding bracket 22 is disposed adjacent to the holding bracket 18 and spaced apart by spacers 24 and 26. The holding bracket 22 is held in place by screws 28 and 30 that are threadedly engaged with the holding bracket 18. A hollow outer shaft 32 is supported by the holding brackets 18 and 22 and extends through the holding bracket 22. An inner shaft 34 is supported by the holding brackets 18 and 22 and extends through the center of the hollow outer shaft 32. A pinion gear 36 and a spring 38 are attached to the inner shaft 34 and disposed between the holding brackets 18 and 22.

As also seen in FIG. 1, a sector 40 is pivoted on a shaft 42 and the teeth of the sector engage the teeth of the pinion gear 36. The shaft 42 is also held in place by the holding brackets 18 and 22. An attaching bracket 44 has one end thereof connected to the free end of the Bourdon tube 16 and the other end thereof connected to a link 46. The other end of the link 46 is connected to the leverage end of the sector 40. The above structure forms a conventional Bourdon tube pressure gauge.

In accordance with an important feature of the present invention, the Bourdon tube 16 includes a vane 48 secured thereto for controlling an optical coupler as will be described in more detail below. In particular, the vane 48 is preferably secured to the Bourdon tube 16 where the end of the attaching bracket 44 connects to the free end of the tube. The vane 48 can be integrally-formed with the Bourdon tube 16 or may alternatively be secured, via welding or the like, to the attaching bracket 44. These structures, however, are not meant to be limiting, as the vane may be attached to any movable member of the pressure gauge 10.

In operation, when the pressure within the conduit 12 increases or decreases, a corresponding increase or decrease of pressure within the Bourdon tube 16 occurs. For example, as the pressure increases within the Bourdon tube 16, the arc thereof increases, thus rotating the sector 40. As the sector 40 rotates, the teeth thereof engage with the pinion gear 36, thus translating the pivoting motion to the outer shaft 32 to rotate an indicator or the like. Likewise, when the pressure within the Bourdon tube 16 decreases, the arc of the Bourdon tube decreases, thus pivoting the sector 40 in the opposite direction and rotating the outer shaft 32 in a counterclockwise direction. Such deflections of the Bourdon tube 16 also cause the vane 48 to move between first and second end positions. In particular, when little or no pressure is applied to the conduit 12, the Bourdon tube 16 is in a relaxed position, corresponding to the first position of the vane 48. Likewise, when the external pressure applied to the conduit 12 increases, the vane 48 eventually moves to a predetermined second position. As will be described in more detail below, this predetermined second position of the vane 48 controls the operation of a detector circuit.

Figure 2:
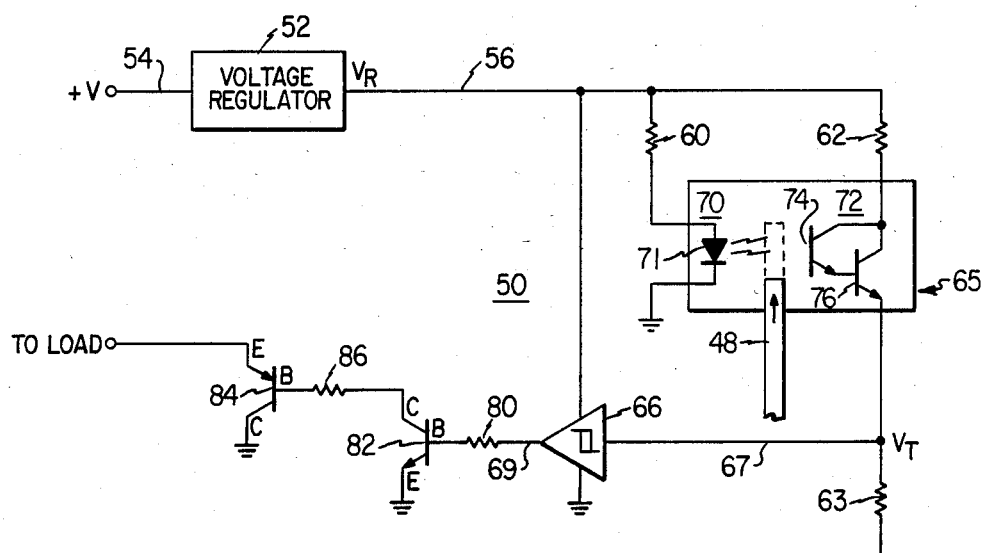
FIG. 2 is a schematic diagram of an electronic detector network for use with the Bourdon tube pressure gauge of FIG. 1.

With reference to FIG. 2, the detector circuit of the condition responsive apparatus is shown in detail. In the preferred embodiment of the invention, this detector circuit is designed for use with the pressure gauge 10 of FIG. 1, the pressure gauge having a Bourdon tube 16 expandable in response to an external pressure. Referring now to FIG. 2, the detector network 50 includes a voltage regulator 52 for receiving a line voltage $+V$ on line 54. The voltage regulator 52 produces a fixed output voltage $V_R$ on line 56 independent of normal variations in the line voltage or changes in the load impedance. The regulated voltage $V_R$ is applied via line 56 to resistors 60 and 62, and also via line 64 to the power supply input of a pulse generating circuit 66. The resistors 60 and 62 are also connected to an optical coupler 68 having a first stage 70 and a second stage 72. More specifically, the first stage 70 includes a light-emitting diode 71, the anode of which is connected to the resistor 60. The cathode of the light-emitting diode 71 is connected to ground. The secondary stage 72 of the optical coupler 68 includes a Darlington amplifier comprising an input photo-transistor 74 and an output driver transistor 76. The resistor 62 is connected to the collector terminals of the transistors 74 and 76, while the emitter of the photo-transistor 74 is connected to the base of the output driver transistor 76.

Referring simultaneously to FIGS. 1 and 2, the various components of the optical coupler 68 are mounted by any suitable means in close proximity to the vane 48 such that the vane can move between the light-emitting diode 71 and the photo-transistor 74. In particular, when the Bourdon tube 16 is in its relaxed position, i.e., when little or no external pressure is applied to the conduit 12, the vane 48 does not serve to block any of the infrared radiation produced by the light-emitting diode 71. Therefore, most of this infrared radiation is detected by the photo-transistor 74. In particular, the infrared radiation received from the light-emitting diode 71 serves as a base drive for the photo-transistor 74, with the output thereof being further amplified by the driver transistor 76. To the contrary, when external pressure is applied to conduit 12, the arc of the Bourdon tube 16 increases, thus moving the vane 48 to its second position shown by the dotted line in FIG. 2. In this second position, most of the infrared radiation from the light-emitting diode 71 is blocked by the vane 48, effectively reducing the emitter current of the photo-transistor 76.

Referring back to FIG. 2, in the preferred embodiment the optical coupler 68 forms part of a voltage divider 65 which serves to control the operation of the pulse generating circuit 66. Specifically, the impedance of the secondary stage 72 in series with the resistor 62 forms a first arm of the voltage divider 65, the second arm thereof being formed by a resistor 63. In operation, when the Bourdon tube 16 is in its relaxed position, i.e., when the photo-transistor 74 has a large base drive, the impedance of the secondary stage 72 is relatively large, thus producing a low voltage at the voltage node $V_T$.

As seen in FIG. 2, node $V_T$ is connected via line 67 to an input of the pulse generating circuit 66. In contradistinction, when the vane 48 of the Bourdon tube 16 has moved between the components of the optical coupler 68, the impedance of the secondary stage is reduced, thereby increasing the voltage at the node $V_T$. This increased voltage serves to control the operation of the pulse generating circuit.

In particular, the pulse generating circuit 66 is preferably a Schmitt trigger circuit. As is well-known in the prior art, this circuit serves as a bistable pulse generator having an output pulse of constant amplitude when the input voltage exceeds a certain d.c. value. According to the present invention, the d.c. trigger point is set at a predetermined value such that the voltage at node $V_T$ will not produce an output from the pulse generating circuit 66 when the vane is in the first position. However, once the vane 48 moves between the light-emitting diode 71 and the photo-transistor 74, the voltage on line 67 rises to a value greater than the threshold of the Schmitt trigger 66, thus triggering this circuit to produce a control signal on line 69. This control signal indicates movement of the vane 48 in response to the external pressure in the conduit 12 as discussed above with respect to FIG. 1.

Referring back to FIG. 2, the control signal output from the pulse generating circuit 66 is applied via line 69 to a control transistor 82 through a base bias resistor 80. The pulse output from the pulse generating circuit 66 serves to turn the control transistor ON, thereby generating an output signal at the collector thereof, this output signal indicating movement of the vane 48 in response to the external pressure in the conduit 12. This output signal is then applied via line 73 to a power transistor 84 through a base bias resistor 86. The power transistor 84 amplifies the output signal and applies this signal to a load (not shown) in the emitter circuit thereof.

Therefore, it can be seen that the detector circuit of FIG. 2 provides a simple, yet efficient electronic control circuit for providing an indication of a fluid pressure condition, or for activating a control element in response thereto. As discussed above, this operation is provided by an optical coupler mounted in proximity to a vane that is attached to a Bourdon tube. As the Bourdon tube flexes with increased pressure, the vane passes between a light-emitting diode and a photo-transistor of the optical coupler, thus blocking infrared radiation from the diode. Preferably, the optical coupler includes a Darlington amplifier which forms part of a voltage divider network including resistors 62 and 63. In operation, when the vane passes between the diode and the photo-transistor, a pulse generating circuit responds to the increased voltage across the output of the voltage divider and is thus triggered to turn on transistor amplifiers.

It should be appreciated that although the above description has been directed to a condition responsive apparatus including a Bourdon tube pressure gauge, this description is not meant to be limiting. It is envisioned that the detector circuit of FIG. 2 can be utilized in any condition responsive apparatus having a control member movable in response to a predetermined physical condition.

Although the invention has been described in detail, it is to be clearly understood that the same is by way of illustration and example only and is not be taken by way of limitation, the spirit and scope of the invention being limited only to the terms of the appended claims.

What is claimed is:

1. A condition responsive apparatus having a control member movable in response to a pre-determined physical condition, comprising:
    an optical coupler including a solid state light source and a detector comprising an input photo transistor and an output driver transistor for producing an output signal;
    a vane attached to the control member for movement therewith between the light source and the input photo transistor from a first position to a second position in response to a change in the physical condition;
    a pulse generating circuit having an input for receiving a drive voltage and generating a control signal in response thereto;
    a coupling circuit connected to the output driver transistor and in response to movement of the vane from the first position to the second position generating the drive voltage above a threshold level to said pulse generating circuit, said pulse generating circuit producing the control signal in response to the drive voltage above the threshold level; and
    control means connected to said pulse generating circuit for receiving the control signal and in response thereto generating an output signal indicating movement of the control member in response to the change in physical condition.

2. The condition responsive apparatus as described in claim 1 wherein said coupling circuit includes a voltage divider circuit having a first arm comprising a first resistor and said Darlington amplifier, and a second arm comprising a second resistor.

3. The condition responsive apparatus as described in claim 2 wherein said first resistor is connected between a power supply and a collector terminal of said output driver transistor.

4. The condition responsive apparatus as described in claim 2 wherein said second resistor is connected between a voltage node at an output of the voltage divider, and ground, said voltage node being further connected to an emitter terminal of said output driver transistor.

5. A condition responsive apparatus having a control member movable in response to a pre-determined physical condition, comprising:
    an optical coupler including a solid state light source and a detector;
    a vane attached to said control member for movement therewith between said light source and said detector from a first position to a second position in response to a change in the physical condition;
    a trigger circuit having an input for receiving a drive voltage and in response thereto generating a control signal;
    a coupling circuit connected to said detector and in response to movement of said vane from the first position to the second position generating the drive voltage above a threshold level to the input of the trigger circuit, said trigger circuit generating the control signal in response to the drive voltage above the threshold level; and
    control means including a control transistor having an input electrode connected to said trigger circuit and in response to the control signal generating an output signal indicating movement of the control member in response to a change in physical condition.

6. The condition responsive apparatus as described in claim 5 wherein said control means further includes a power transistor having a base, emitter and collector, said collector of said control transistor connected to said base of said power transistor.

7. A condition responsive apparatus, comprising:
    a pressure gauge having a Bourdon tube expandable in response to an external pressure;
    an optical coupler including a solid state light source and detector;
    a vane attached to said Bourdon tube for movement between said light source and said detector from a first position to a second position in response to said external pressure;
    a pulse generating circuit;
    a voltage divider responsive to movement of said vane from said first position to said second position for connecting an output signal from said detector to said pulse generating circuit, said pulse generating circuit generating a control signal in response thereto;
    control means connected to said pulse generating circuit for receiving said control signal and in response thereto generating an output signal; and
    power means connected to said control means for applying said output signal to a load.

8. The condition responsive apparatus as described in claim 7 wherein said voltage divider includes first and second arms, said first arm including said detector and a first resistor, said second arm including a second resistor.

9. The condition responsive apparatus as described in claim 8 wherein said detector comprises a Darlington amplifier having an input photo-transistor, and an output driver transistor for producing said output signal.

10. The condition responsive apparatus as described in claim 8 wherein said second resistor is connected between a voltage node at an output of said voltage divider, and ground, said voltage node being further connected to an emitter terminal of said output driver transistor.

11. The condition responsive apparatus as described in claim 10 wherein said pulse generating circuit is a Schmitt trigger circuit having an input, said voltage node being connected to said input.

12. The condition responsive apparatus as described in claim 11 wherein said control means includes a control transistor having a base, emitter and collector, said base connected to an output of said Schmitt trigger circuit.

13. The condition responsive apparatus as described in claim 17 wherein said power means includes a power transistor having a base, emitter and collector, said collector of said control transistor being connected to said base of said power transistor.

14. A condition responsive apparatus, comprising:
    a pressure gauge having a Bourdon tube expandable in response to an external pressure;
    an optical coupler including a light-emitting diode and a Darlington amplifier detector, said Darlington amplifier detector including an input photo-transistor and an output driver transistor;
    a vane attached to said Bourdon tube for movement therewith between said light-emitting diode and said photo-transistor from a first position to a second position in response to said external pressure;

a pulse generating circuit having an input connected to a voltage node, said voltage node being further connected to an emitter terminal of said output driver transistor;

a voltage divider having first and second arms, said first arm including a first resistor and said Darlington amplifier, said second arm having a second resistor, said first and second arms connected at said voltage node and serving to connect said output driver transistor to said pulse generating circuit, said pulse generating circuit generating a control signal in response to movement of said vane from said first position to said second position;

a control transistor connected to said pulse generating circuit for receiving said control signal and in response thereto generating an output signal indicating movement of said vane in response to said external pressure; and a power transistor connected to said control transistor for applying said output signal to a load.

15. A condition responsive apparatus, comprising:

a pressure gauge having a Bourdon tube expandable in response to an external pressure;

an optical coupler including a solid state light source and a detector;

a vane attached to said Bourdon tube for movement between said light source and said detector from a first position to a second position in response to the external pressure;

a Schmitt trigger circuit having an input for receiving a drive voltage and in response thereto generating a control signal;

a coupling circuit connected to said detector and in response to movement of said vane from the first position to the second position generating the drive voltage above a threshold level to said Schmitt trigger circuit, said Schmitt trigger circuit generating a control signal in response to the drive voltage above the threshold level; and control means connected to said Schmitt trigger circuit and in response to the output control signal therefrom generating an output signal to a load.

16. A condition responsive apparatus, comprising:

a pressure gauge having a Bourdon tube expandable in response to an external pressure and including an indicator responsive to the expansion of the Bourdon tube;

an optical coupler including a light emitting diode and a Darlington amplifier detector, said Darlington amplifier detector including an input photo transistor and an output driver transistor;

a vane attached to said Bourdon tube for movement therewith between said light emitting diode and said photo transistor from a first position to a second position in response to a change in external pressure;

a Schmitt trigger circuit having an input connected to a voltage node for receiving a drive voltage and in response thereto generating a control signal, said voltage node being further connected to the output driver transistor;

a coupling circuit connected to the output driver transistor of said Darlington amplifier detector and in response to movement of said vane from the first position to the second position generating the drive voltage above a threshold level to said Schmitt trigger circuit, said Schmitt trigger circuit generating the control signal in response to the drive voltage above the threshold level;

control means connected to said Schmitt trigger circuit and in response to the control signal generating an output signal; and power means connected to said control means for applying the output signal to a load.

* * * * *